(12) United States Patent
Mason (10) Patent No.: US 9,311,260 B2
(45) Date of Patent: Apr. 12, 2016

(54) CONTEXT PRESERVATION DURING THREAD LEVEL SPECULATIVE EXECUTION

(71) Applicant: Jack Mason, Elk Ridge, UT (US)

(72) Inventor: Jack Mason, Elk Ridge, UT (US)

(*) Notice: Subject to any disclaimer, the term of this patent is extended or adjusted under 35 U.S.C. 154(b) by 277 days.

(21) Appl. No.: 14/100,478

(22) Filed: Dec. 9, 2013

(65) Prior Publication Data

US 2015/0160967 A1    Jun. 11, 2015

(51) Int. Cl.
- *G06F 9/46* (2006.01)
- *G06F 13/24* (2006.01)
- *G06F 9/52* (2006.01)

(52) U.S. Cl.
CPC *G06F 13/24* (2013.01); *G06F 9/46* (2013.01); *G06F 9/461* (2013.01); *G06F 9/528* (2013.01)

(58) Field of Classification Search
USPC ................................. 718/108, 102; 710/260
See application file for complete search history.

(56) References Cited

U.S. PATENT DOCUMENTS

| | | | |
|---|---|---|---|
| 6,345,351 B1 * | 2/2002 | Holmberg | 711/203 |
| 7,120,762 B2 * | 10/2006 | Rajwar et al. | 711/150 |
| 8,424,015 B2 * | 4/2013 | Arndt et al. | 718/108 |
| 2004/0073906 A1 * | 4/2004 | Chamdani et al. | 718/102 |
| 2006/0294326 A1 * | 12/2006 | Jacobson et al. | 711/156 |
| 2007/0239943 A1 * | 10/2007 | Dice et al. | 711/147 |
| 2008/0263280 A1 | 10/2008 | Gara | |
| 2011/0209151 A1 * | 8/2011 | Chung et al. | 718/101 |
| 2011/0219381 A1 | 9/2011 | Ahn | |
| 2011/0264898 A1 * | 10/2011 | Chaudhry et al. | 712/228 |
| 2012/0084477 A1 | 4/2012 | Arndt | |
| 2013/0073835 A1 | 3/2013 | Jacobson | |

OTHER PUBLICATIONS

Preemption, <https://en.wikipedia.org/wiki/Preemption_(computing)>, accessed Oct. 30, 2015.*
International Search Report for PCT/US14/69103, mailed Feb. 26, 2015.

* cited by examiner

*Primary Examiner* — Khanh Dang
(74) *Attorney, Agent, or Firm* — Brian Tucker; Kirton McConkie (57) ABSTRACT

A microarchitecture can be configured to allow a thread's speculative state to be stored when the thread is preempted. The stored speculative state can then be loaded back into the microarchitecture when the thread is resumed to thereby enable the thread to resume execution at the speculative state that existed when the thread was preempted. By maintaining the speculative state of threads, a greater amount of parallel processing is achieved.

20 Claims, 10 Drawing Sheets

CONTEXT PRESERVATION DURING THREAD LEVEL SPECULATIVE EXECUTION

CROSS-REFERENCE TO RELATED APPLICATIONS

Not Applicable.

BACKGROUND

Multithreading is a technique for allowing multiple threads to execute concurrently while sharing resources of a processor. These resources include the processing unit (or core) as well as the registers and other memory internal to the core (e.g. write buffers, L1 cache, etc.). When processing switches from a first thread to a second thread, the operating system will cause the state of the core's internal registers to be stored. This enables the first thread, at a later time, to resume execution where it left off prior to the switch. These context switches can occur very frequently (e.g. at least every 10 milliseconds in response to a periodic timer interrupt and possibly as frequently as every 100-1,000 instructions due to exceptions) thereby giving the appearance that the threads are executed in parallel. In this specification, the term interrupt will be used generally to refer to both interrupts and exceptions as these terms are commonly used in the art.

In a multithreaded architecture, because multiple threads may require access to the same data, it is necessary to implement techniques to ensure the validity of the data accessed and relied upon by each thread. One way to ensure data validity is to implement a locking scheme where one thread obtains exclusive access to a range of data while the thread operates on the data. Although locking schemes are effective to ensure data validity, they can significantly slow the performance of a multithreaded process. For example, if one thread requires access to a range of data locked by another thread, the thread may have to block until the lock is released. Locking therefore increases the amount of serial execution in a multithreaded process.

To address the inefficiencies caused by locking, various types of speculative execution have been proposed. Speculative execution generally refers to the execution of an instruction stream even though it is not known whether the instructions will be executed or, if they will be executed, whether the current state of execution is valid for their execution. One type of speculative execution, known as thread level speculation, is a technique where a thread is allowed to continue execution based on the assumption that data relied upon by the thread will not be changed by any other thread. In other words, thread level speculation is an optimistic approach that assumes that most, if not all, concurrently executing threads will not update the same data.

Figure 1:
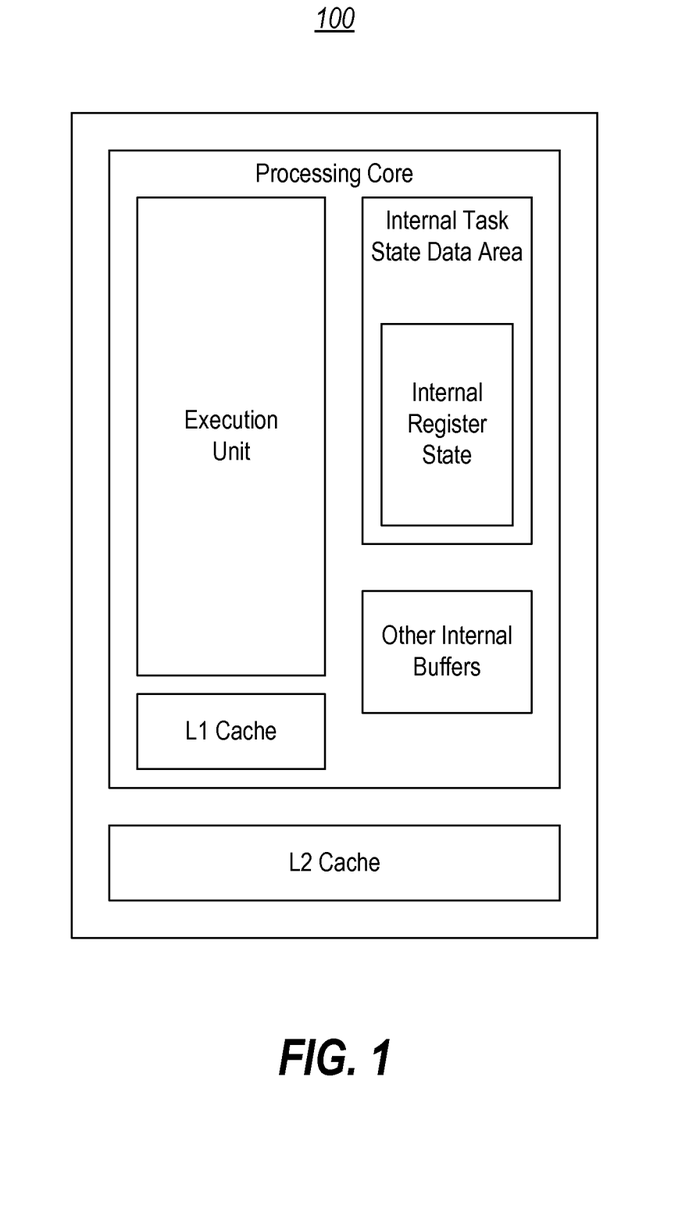
FIG. 1 illustrates an example architecture of a processor in which thread level speculation can be implemented.

FIG. 1 illustrates an example architecture of a processor 100 in which thread level speculation can be implemented. Processor 100 is shown as including a single core; however, a multicore processor would have multiple processing cores that are each configured as shown. The internal task state data area represents the portion of an executing thread's state that will be maintained during a context switch. For example, when a context switch occurs, the values stored in the core's general registers will be stored to allow the thread to resume operation at a later time. The storing of these values will occur in any multithreaded implementation whether or not thread level speculation is implemented.

The internal task state data area can be viewed as the source of data that is written to memory during a context switch. In the x86 architecture, for example, the source of the data that is stored includes the general registers (EAX, ECX, EDX, EBX, ESP, EBP, ESI, EDI), the segment registers (ES, CS, SS, DS, FS, GS), the flags register (EFLAGS), and the instruction pointer (EIP). The values in these registers are written into a data structure known as the task state segment (TSS). In this specification, the task state data area will refer to either an internal task state data area or an external task state data area. The internal task state data area represents the values within the processor that will be stored during a context switch while the external task state data area represents the actual data structure in memory where these values are stored.

To enable thread level speculation, additional buffers (i.e. the other internal buffers depicted in FIG. 1) are maintained to store the results of the speculative execution. For example, if an executing thread loads a data value that is currently being operated on by another suspended thread, it is unknown whether the suspended thread will eventually update the data value. The executing thread therefore continues execution based on the assumption that the suspended thread will not ultimately update the data value. However, because it is unknown whether the speculative execution will become valid, the results of the speculative execution are temporarily stored in the other internal buffers. If the suspended thread ultimately does not update the data value, the buffered results of the speculative execution can be stored. However, if the suspended thread updates the data value (i.e. if a data collision occurs), the thread can be rolled back to recommence execution using the updated value.

In theory, if few data collisions occur, thread level speculation can increase the performance of a multithreaded process by increasing the amount of parallel processing. In other words, thread level speculation eliminates blocking that would otherwise occur if locks were implemented.

Various implementations of thread level speculation have been proposed. (See, e.g. Martinez, J. F., & Torrellas, J., Speculative Synchronization: Applying Thread-Level Speculation to Explicitly Parallel Applications, Proceedings of the $10^{th}$ International Conference on Architectural Support for Programming Languages and Operating Systems (ASPLOS-X)(ASPLOS '02), 18-29; Rajwar, R., & Goodman, J. R., Speculative Lock Elision: Enabling Highly Concurrent Multithreaded Execution, Proceedings of the 34th International Symposium on Microarchitecture (MICRO '01), 294-305; and Rundberg, P, & Stenström, P., Speculative Lock Reordering: Optimistic Out-of-Order Execution of Critical Sections, Proceedings of the International Parallel and Distributed Processing Symposium (IPDPS '03), 8 pp.).

Figure 2:
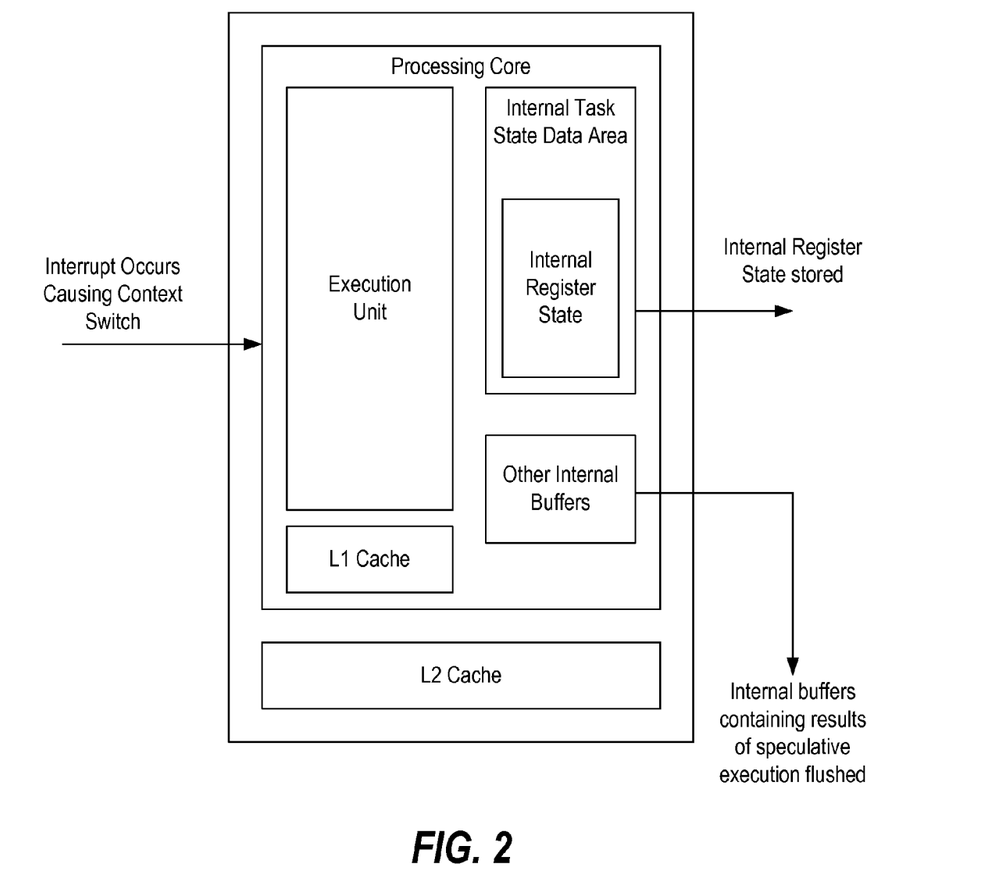
FIG. 2 illustrates how the internal buffers of a processor are flushed when a thread is preempted.

Although in simulated environments these proposed implementations provided promising improvements in thread level parallelism, each implementation failed to identify the effects of interrupts on the implementation. Referring to FIG. 2, when a context switch occurs (e.g. in response to an interrupt), the internal task state data area is stored to allow the preempted thread to resume processing at a later time. In contrast, the internal buffers which store the results of any speculative execution are flushed. Because the internal buffers are flushed, for these proposed implementations to be successful, each thread involved in speculative execution on shared data must execute to completion without any of the threads being preempted. In an actual implementation, it is likely that at least one of the threads would be preempted prior to completion thereby requiring each thread to be restarted. For this reason, the results shown in these proposed implementations could not be replicated in actual implementations where interrupts would frequently occur.

BRIEF SUMMARY

The present invention extends to methods, systems, and computer program products for implementing context preservation during thread level speculative execution. By implementing the present invention, the speculative state of a thread can be recreated even after the thread has been preempted. In this way, a greater amount of parallel thread execution on shared resources can be obtained.

In one embodiment, the present invention can be implemented as a method for storing a speculative state of a thread that is being executed by a processor in accordance with a thread level speculative execution technique. A thread is executed in accordance with a thread level speculative execution technique including maintaining, within the processor, a speculative state of the thread. It is detected that the thread will be preempted while being executed in accordance with the thread level speculative execution technique. The speculative state is then stored to allow the speculative state to be recreated within the processor when execution of the thread is resumed.

In another embodiment, the present invention is implemented as a processor. The processor comprises an execution unit, a plurality of registers for storing values generated by the execution unit, and one or more buffers for storing a speculative state of a thread while the thread is being executed in accordance with a thread level speculative execution technique. In response to the thread being preempted while being executed in accordance with the thread level speculative execution technique, the speculative state of the thread that is stored in the one or more buffers is written to memory to allow the speculative state to be loaded back into the one or more buffers when the thread is resumed.

In another embodiment, the present invention is implemented as a method for storing a speculative write buffer of a thread when the thread is preempted. During execution of a thread on a processor, it is determined that the thread is attempting to access shared data. In response to determining that the thread is attempting to access shared data, execution of the thread is commenced in accordance with a thread level speculative execution technique including maintaining a speculative write buffer that buffers memory accesses made by the thread while being speculatively executed. While the thread is being speculatively executed, it is determined that the thread will be preempted. The speculative write buffer is then written to memory to allow the speculative write buffer to be loaded back into the core when the thread resumes execution.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for implementing context preservation during thread level speculative execution. By implementing the present invention, the speculative state of a thread can be recreated even after the thread has been preempted. In this way, a greater amount of parallel thread execution on shared resources can be obtained.

In one embodiment, the present invention can be implemented as a method for storing a speculative state of a thread that is being executed by a processor in accordance with a thread level speculative execution technique. A thread is executed in accordance with a thread level speculative execution technique including maintaining, within the processor, a speculative state of the thread. It is detected that the thread will be preempted while being executed in accordance with the thread level speculative execution technique. The speculative state is then stored to allow the speculative state to be recreated within the processor when execution of the thread is resumed.

In another embodiment, the present invention is implemented as a processor. The processor comprises an execution unit, a plurality of registers for storing values generated by the execution unit, and one or more buffers for storing a speculative state of a thread while the thread is being executed in accordance with a thread level speculative execution technique. In response to the thread being preempted while being executed in accordance with the thread level speculative execution technique, the speculative state of the thread that is stored in the one or more buffers is written to memory to allow the speculative state to be loaded back into the one or more buffers when the thread is resumed.

In another embodiment, the present invention is implemented as a method for storing a speculative write buffer of a thread when the thread is preempted. During execution of a thread on a processor, it is determined that the thread is attempting to access shared data. In response to determining that the thread is attempting to access shared data, execution of the thread is commenced in accordance with a thread level speculative execution technique including maintaining a speculative write buffer that buffers memory accesses made by the thread while being speculatively executed. While the thread is being speculatively executed, it is determined that the thread will be preempted. The speculative write buffer is then written to memory to allow the speculative write buffer to be loaded back into the core when the thread resumes execution.

Figure 3A:
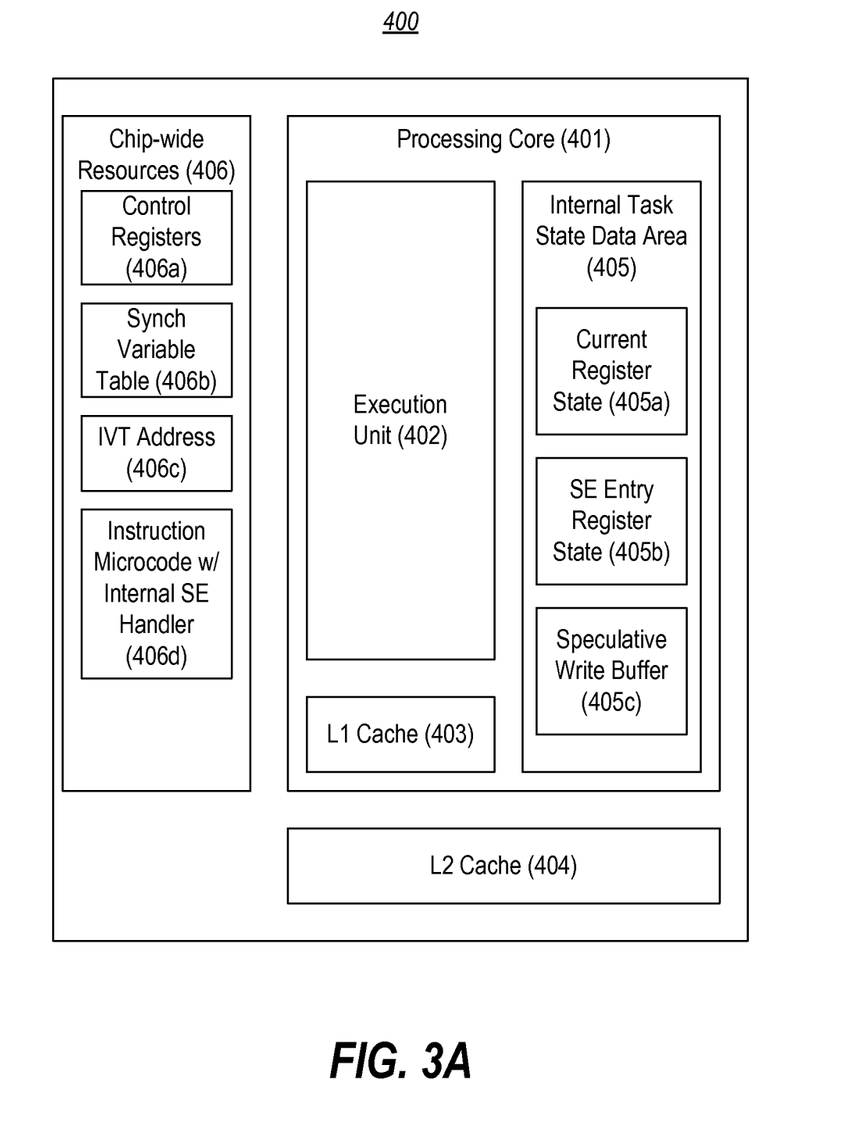
FIG. 3A illustrates an architecture of a processor in which thread level speculation is implemented in accordance with one or more embodiments of the invention.

FIG. 3A illustrates an architecture of a processor 400 in which thread level speculation is implemented in accordance with one or more embodiments of the invention. As shown, internal task state data area (TSDA) 405 includes current register state 405a, speculative execution entry register state 405b, and speculative write buffer 405c. Current register state 405a represents the data stored in the core's general processors which would be stored during a context switch in any multithreading architecture (i.e. current register state 405a can be viewed as the same as the internal register state depicted in FIGS. 1 and 2).

In contrast to the architectures employed in previous thread level speculation approaches, internal TSDA 405 also includes speculative execution entry register state 405b and speculative write buffer 405c. Speculative execution entry register state 405b stores the thread's state of execution upon entering speculative execution (e.g. to enable rollback to the point where speculative execution began). Speculative write buffer 405c stores the address and value of each datum read or written during speculative execution. When a thread is preempted, the microarchitecture can write the speculative execution entry register state 405b and the speculative write buffer 405c to memory. Accordingly, unlike prior approaches which flushed the internal buffers which stored speculative data, the present invention allows such data to be stored along with the general register state of the thread.

Figure 4A:
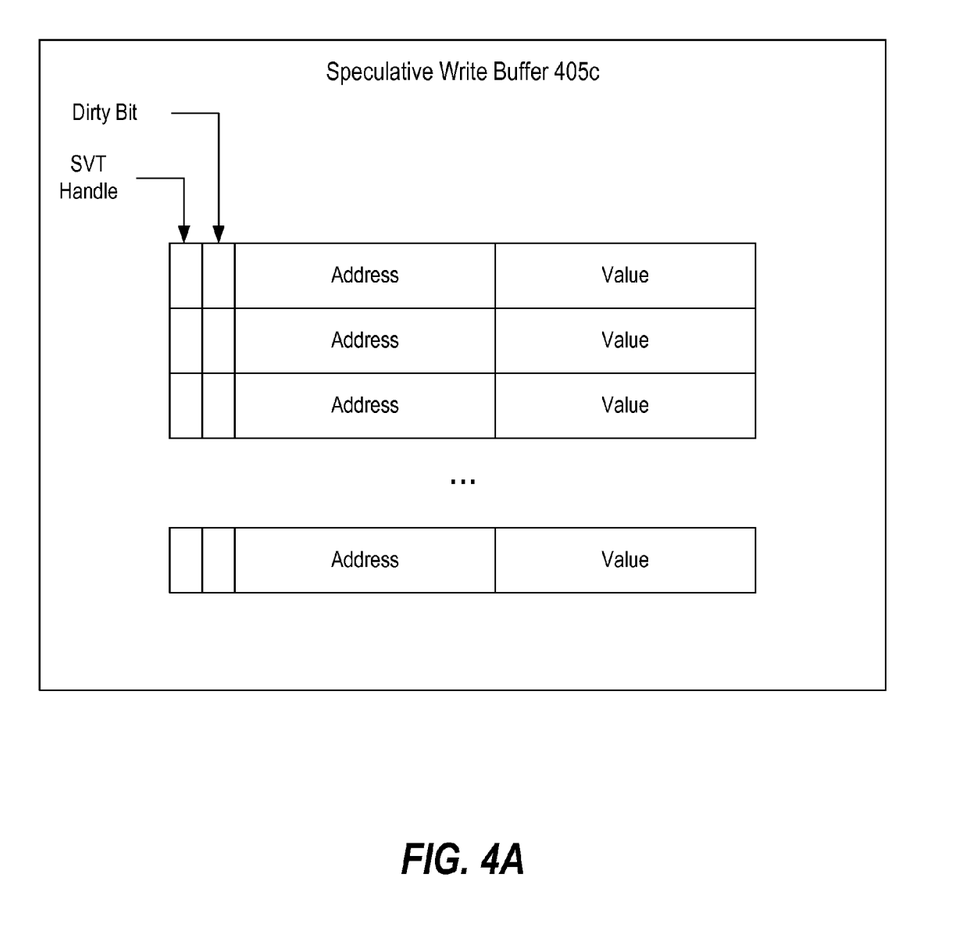
FIGS. 4A and 4B each illustrate a speculative write buffer that can be used to buffer memory accesses made by a thread while being speculatively executed.
Figure 5:
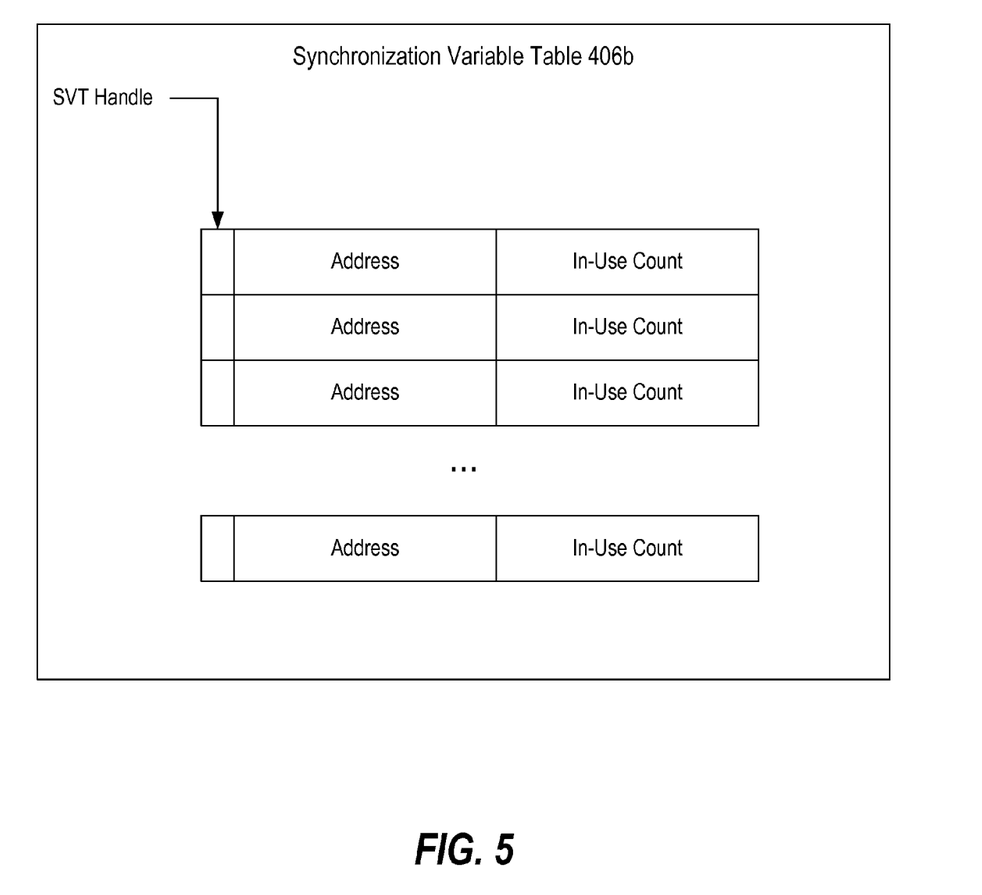
FIG. 5 illustrates a synchronization variable table that can be used to track which threads have accessed shared data.

An example of speculative write buffer 405c is shown in FIG. 4A. As shown, in addition to listing the address and value for each datum read or written during speculative execution, each entry in speculative write buffer 405c can also include a dirty bit which when set indicates that the associated value was updated by the thread (i.e. that the value should be written to memory if execution is allowed to complete). Each entry also includes a synchronization variable table (SVT) handle to the entry in SVT 406b corresponding to the datum. Synchronization variables are used to represent blocks of shared data and to indicate the number of threads that are concurrently accessing the blocks. FIG. 5 illustrates an example configuration of SVT 406b. Each entry in SVT 406b defines an address and an in-use count of a synchronization variable. SVT 406b is a chip-wide resource that is employed to synchronize shared access to data by multiple concurrently executing threads in a thread level speculation technique. The role of the synchronization variables and in particular the in-use count will be further described below.

Figure 4B:
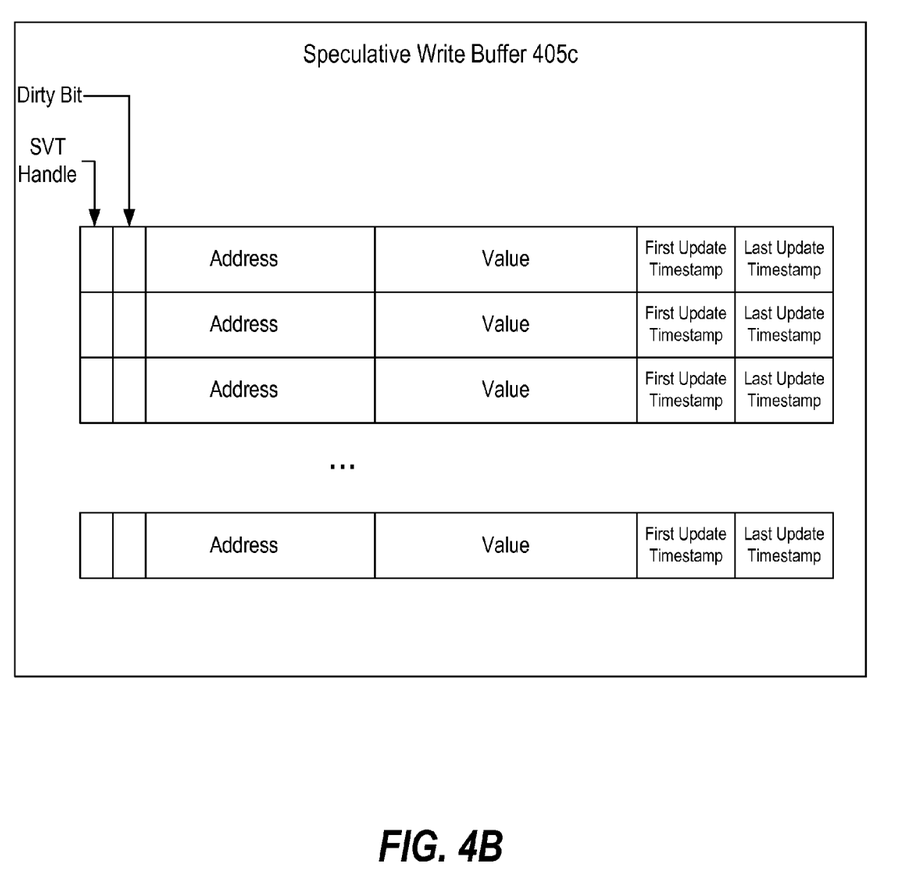

FIG. 4B illustrates an alternative embodiment of speculative write buffer 405c in which each entry in the buffer also includes a first update timestamp and a last update timestamp. The first update timestamp can be set when the thread first updates the value at the associated address. Then, at each subsequent update to the value, the last update timestamp can be set. When enforcing a speculative execution policy (e.g. when identifying whether data collisions have occurred), the operating system can use the first and last update timestamps to potentially increase the parallelism of the concurrently executing threads. For example, if the speculative write buffer 405c for each of three concurrently executing threads indicates that there is a data collision among the three threads' accesses to shared data, the first and last update timestamps can be used to potentially allow two of the three threads to complete execution while only rolling back a single thread (whereas without such timestamps, at most one thread could be allowed to complete). The operating system can perform other types of optimizations by using these timestamps to identify an acceptable sequence of accesses even when data collisions have occurred.

Figure 6:
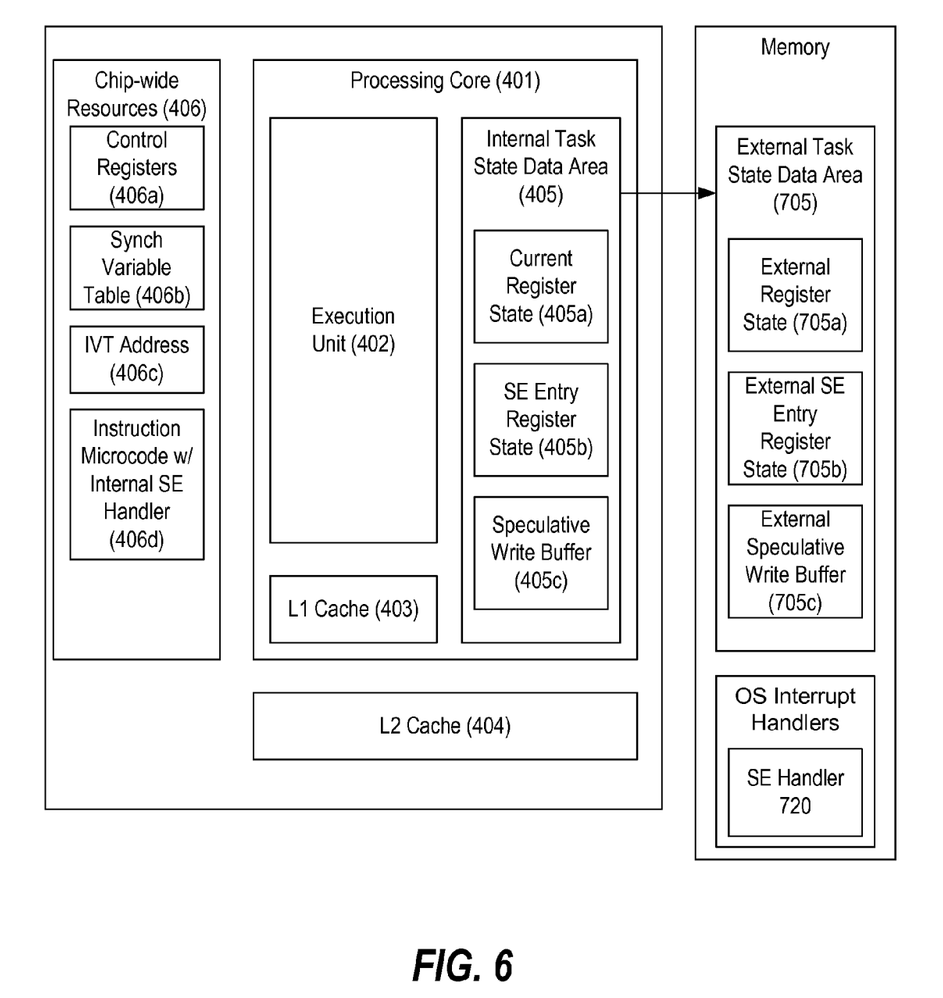
FIG. 6 illustrates how a thread's speculative state can be stored in memory when the thread is preempted.

As shown in FIG. 6, to enable storage of each thread's speculative state, an external TSDA data structure 705 can be allocated (e.g. in memory) for each thread. Then, when the thread is preempted, the microarchitecture can write the values stored in the internal TSDA to the external TSDA data structure in memory. Once the execution of a thread is resumed, the external TSDA data structure can be loaded into the internal TSDA thereby recreating the state, including the speculative state, of the thread prior to being preempted. Accordingly, once the thread is resumed, it may begin executing where it left off even if it was within speculative execution.

In accordance with one or more embodiments of the present invention, various new instructions can be provided to enable thread level speculative execution. A first instruction (e.g. ENTER_SE) can be provided to allow a thread to enter speculative execution, while a second corresponding instruction (e.g. LEAVE_SE) can be provided to allow the thread to exit speculative execution. The execution of these instructions can cause various interrupts to occur thereby invoking appropriate interrupt handlers to perform the necessary processing. The ENTER_SE command can be executed when a thread desires to access shared data as will be described below.

In some embodiments, the handling of the interrupts generated by the ENTER_SE and LEAVE_SE instructions can be split between the microarchitecture and the operating system. In other words, in some embodiments, the present invention provides a speculative execution (SE) interrupt handler that is implemented in both hardware and software.

Figure 3B:
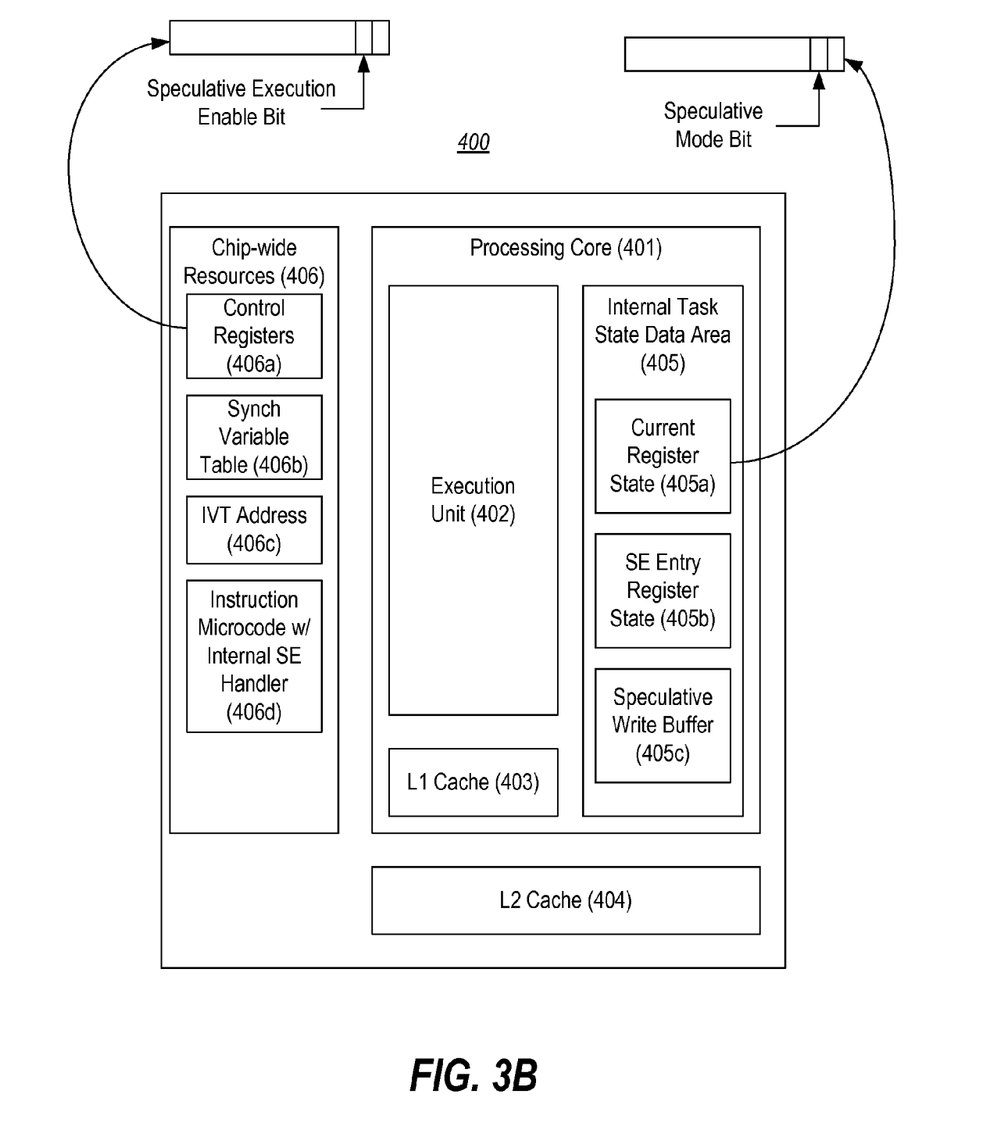
FIG. 3B illustrates another embodiment of an architecture of a processor in which thread level speculation is implemented in accordance with one or more embodiments of the invention.

For example, in one embodiment, a microarchitecture portion (e.g. internal SE handler 406d) of the SE handler can be invoked when either the ENTER_SE or the LEAVE_SE instruction is executed, while the software portion of the SE handler is executed only when the LEAVE_SE instruction is executed. In this embodiment, the microarchitecture portion of the SE handler is primarily tasked with maintaining and updating SVT table 406b. Each time a thread desires to access data that could potentially be accessed by a concurrently executing thread, the thread must obtain the address of a synchronization variable representing the data and pass the address of the synchronization variable as an argument of the ENTER_SE function. Typically, a synchronization variable represents a range of data such as a page of virtual memory. A synchronization variable therefore serves as a unique identifier of shared data that contending threads use to synchronize access to the shared data.

In response to the execution of the ENTER_SE command, the microarchitecture portion of the SE handler uses the supplied address of the synchronization variable to update SVT 406b. Referring to FIG. 5, if the address of the synchronization variable does not exist in SVT 406b (meaning that no other thread is currently accessing the shared data represented by the synchronization variable), an entry is created for the address and the in-use count is set to 1. The in-use count therefore identifies the number of threads that are accessing the same data (or block of data). However, if the address of the synchronization variable is already present in SVT 406b (meaning that at least one other thread is currently accessing the data), the in-use count of the existing entry is incremented. In either case, a handle to the corresponding entry in SVT 406b is returned by the microarchitecture portion of the SE handler. The practical result of this processing is that a count is maintained of the number of threads that are concurrently accessing each shared data portion as well as the identity of each of these threads.

The execution of the LEAVE_SE command at the microarchitecture level operates essentially inversely to the execution of the ENTER_SE command. Specifically, the LEAVE_SE command is called with the SVT handle which was returned by the ENTER_SE command. The SE handler then uses the SVT handle to locate the corresponding entry in SVT 406b and decrements its in-use count. The resultant value of the in-use count is then returned.

After processing of the LEAVE_SE command, if the in-use count is zero, it implies that no other threads are still accessing the shared data. In other words, when the in-use count reaches zero, the determination of data collisions and the rollback of any threads having such collisions can be performed. To cause this determination to be initiated, an interrupt can be generated when the LEAVE_SE is executed allowing the operating system to perform any maintenance considered necessary. Accordingly, after each thread operating on a shared data has completed the LEAVE_SE command (as indicated by the zero value of the corresponding in-use count), the operating system (or more particularly, the software portion of the SE interrupt handler) will detect the zero value for the in-use count and commence the data collision determination.

To appropriately handle the interrupt generated when the LEAVE_SE command is executed, the operating system's interrupt vector table (IVT 406c) can be modified to cause the software portion of the SE handler (e.g. SE handler 720 shown in FIG. 6) to be executed to handle the interrupt. This software portion of the SE handler can examine the speculative write buffer 405c for each thread that accessed the shared data during speculative execution. In other words, the speculative write buffer 405c of each thread that obtained the SVT handle to the synchronization variable representing the shared data (via the ENTER_SE command) can be examined to identify whether any data collisions exist (e.g. two threads updating the same data or one thread updating the same data read by another thread). Threads selected to be rolled back can be rolled back to their state that existed prior to entering speculative execution as defined in SE_Entry Register State 405b. Because this state immediately prior to entering speculative execution is stored, the thread can be returned to this state even if the rollback occurs after the thread is preempted.

If the software portion of the SE handler determines that a thread has no data collisions, the thread can be allowed to commit (e.g. by writing the updates in the speculative write buffer 405c to memory). Because the speculative write buffer 405c is stored during preemption, even if the thread is preempted before it can commit, the speculative write buffer 405c can be recreated after the thread is resumed. In this way, the speculatively executed portion of the thread does not have to be re-executed if the thread is preempted prior to committing.

To ensure that a thread's speculative state is stored during preemption, the microarchitecture can be modified to store the speculative state. For example, processing core 401 can be configured to access the SE entry register state 405b and the speculative write buffer 405c when a thread is to be preempted and write them to memory (e.g. as external SE entry register state 705b and external speculative write buffer 705c as shown in FIG. 6). Accordingly, the microarchitecture can be configured to ensure that a thread's state, including speculative state, is stored during preemption to allow the thread's state to be fully recreated once resumed.

Figure 7:
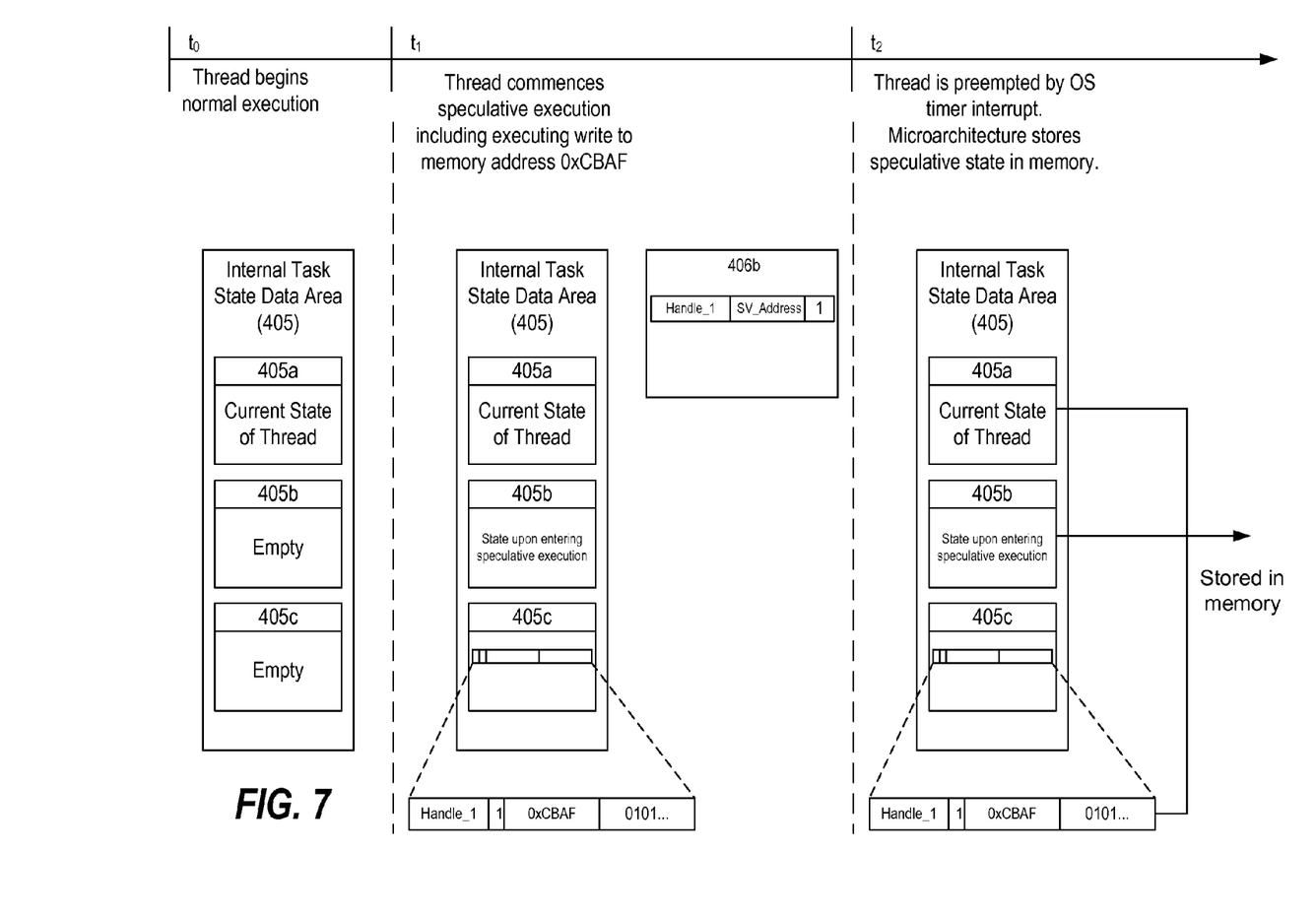
FIG. 7 illustrates a timeline showing how a thread creates speculative state and how this speculative state is stored when the thread is preempted.

FIG. 7 provides a timeline showing how a thread creates speculative state and how this speculative state is stored when the thread is preempted. Initially, at time $t_0$ the thread begins normal execution. During normal execution, because the thread is not accessing shared data, any updates can be directly stored and do not need to be buffered in speculative write buffer 405c.

Then, at time $t_1$ the thread calls ENTER_SE to enable the thread to access shared data. The thread's state upon entering speculative execution is stored in SE entry register state 405b. The call to ENTER_SE includes an address of the synchronization variable (shown as SV_Address in SVT 406b) representing the shared data the thread desires to access (which is at address 0xCBAF as shown in speculative write buffer 405c). ENTER_SE returns a handle to the entry for the synchronization variable (shown as Handle_1 in speculative write buffer 405c). Speculative write buffer 405c is also shown as including the updated value (0101 . . . ) for memory address 0xCBAF.

Finally, at time $t_2$ the thread is preempted by the OS timer interrupt. The microarchitecture accesses current register state 405a, SE entry register state 405b, and speculative write buffer 405c and writes them to memory (e.g. in external TSDA 705). At a later time, when the thread is resumed, the stored values can be loaded to allow the thread to resume execution where it left off upon being preempted. In this way, the entry in speculative write buffer 405c as well as the thread's state upon entering speculative execution is preserved.

Once the thread completes its speculative execution and calls LEAVE_SE (and assuming the call to LEAVE_SE causes the in-use count to become zero), the software portion of the SE handler can identify each handle in the thread's speculative write buffer 405c and compare these handles to the handles in the speculative write buffer of any other concurrently executing threads. Any identified collisions can be resolved accordingly (i.e. by identifying one or more victim threads and rolling back the victim threads to their state upon entering speculative execution as defined in their SE entry register state 405b).

In some embodiments of the invention, the microarchitecture can be modified to include a speculative execution enable bit. For example, as shown in FIG. 3B, control registers 406a can be modified to include a speculative execution enable bit which when set enables speculative execution to be performed on any of the cores of the microarchitecture. In this way, speculative execution can be enabled or disabled on a chip-wide basis. Also, in some embodiments as shown in FIG. 3B, each core can be modified to include a speculative mode bit which identifies whether the core is currently executing a thread speculatively. This bit can be set upon commencing speculative execution (e.g. when ENTER_SE is executed) and reset upon completing speculative execution (e.g. when LEAVE_SE is executed). For example, the EFLAGS register of the x86 architecture can be modified to include a speculative mode bit.

Figure 8:
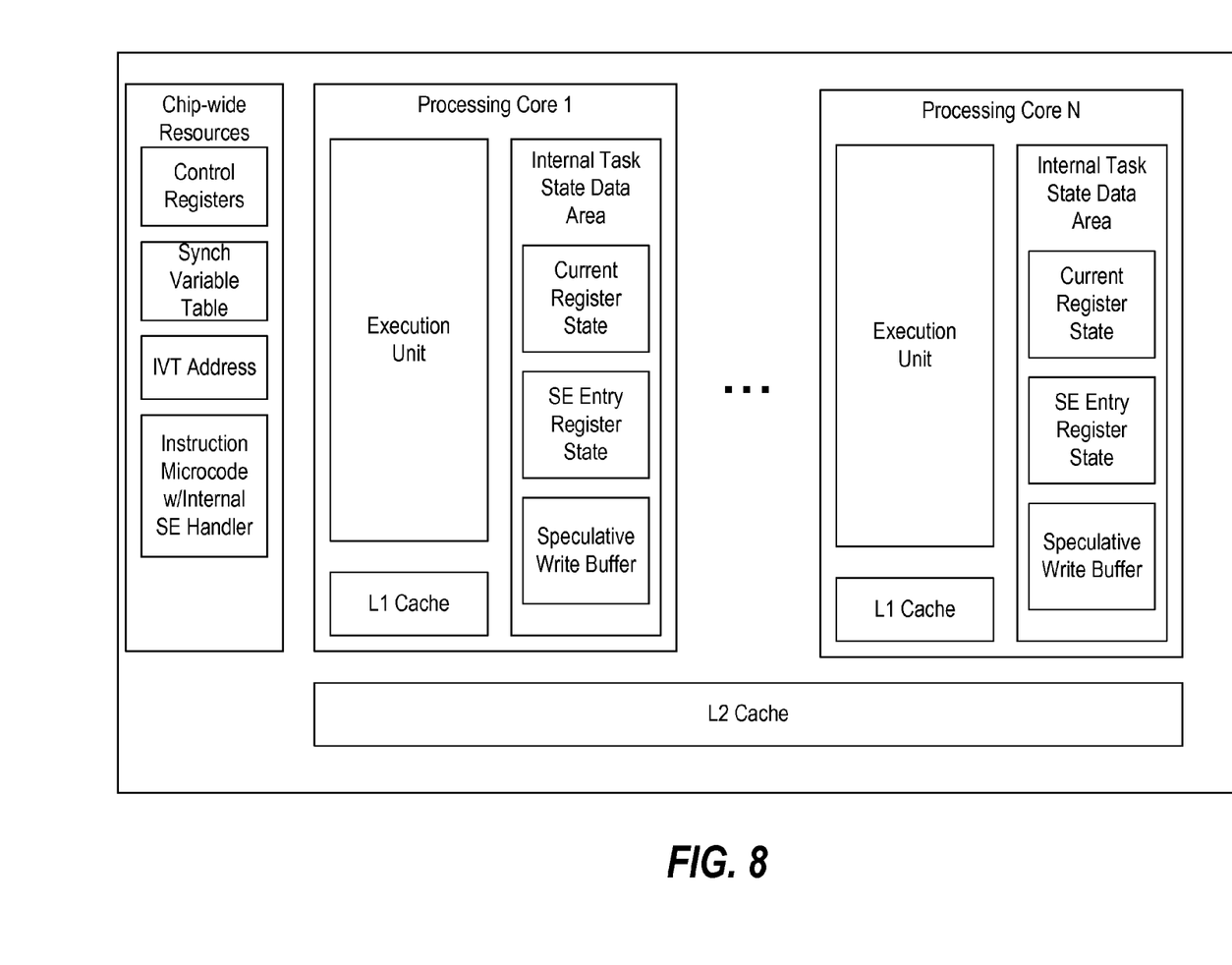
FIG. 8 illustrates a multicore processor that can implement the thread level speculative execution techniques of the present invention.

Although the above description is based on a single core processor architecture, the described techniques can equally be employed in a multicore processor. For example, as shown in FIG. 8, each core of a multicore processor can maintain the SE entry register state and the speculative write buffer of the thread it is currently executing which can be stored when the thread is preempted. As with a single core processor, a SVT can be maintained for providing handles to synchronization variable entries and for maintaining an in-use count. The SVT can be updated in response to a thread executing the ENTER_SE and LEAVE_SE commands regardless of the core on which the thread is executing. Accordingly, the present invention can be easily scaled to processors of many cores.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for storing a speculative state of a thread that is being executed by a processor in accordance with a thread level speculative execution technique, the method comprising:
   during execution of a thread, executing a first instruction that indicates that the thread is entering into speculative execution, the first instruction including an address of a synchronization variable as an argument of the first function, the synchronization variable representing a first range of shared memory addresses that includes at least one memory address that the thread intends to access during speculative execution, executing the first instruction comprising,
      storing, within the processor, a current state of the thread that exists prior to executing the first instruction;
      creating or updating a first SVT entry in a synchronization variable table, the first SVT entry comprising the address of the synchronization variable, an in-use count, and an SVT handle representing the first SVT entry; and
      returning the SVT handle;
   during speculative execution of the thread, maintaining, within the processor, a speculative state of the thread, the speculative state of the thread including a speculative write buffer that includes an entry for each memory address that the thread accesses during speculative execution, the speculative write buffer including a first buffer entry comprising the SVT handle, a particular memory address within the first range of shared memory addresses that was accessed by the first thread, and a value for the particular memory address;
   detecting that the thread will be preempted during speculative execution; and
   storing the speculative state to allow the speculative state to be recreated within the processor when execution of the thread is resumed.

2. The method of claim 1, wherein the value in the first buffer entry is a value written by the thread during speculative execution.

3. The method of claim 2, wherein the first buffer entry includes a first update timestamp defining a first time when the thread updated the value of the particular memory address during the speculative execution, and wherein the first buffer entry also includes a last update timestamp defining a last time when the thread updated the value of the particular memory address during the speculative execution.

4. The method of claim 1, wherein the value in the first buffer entry is a value read by the thread during speculative execution.

5. The method of claim 1, wherein the first buffer entry further includes a dirty bit which when set indicates that the value in the first buffer entry is a value written by the thread during the speculative execution.

6. The method of claim 1, further comprising:
   after the preemption, resuming the speculative execution of the thread including,
      executing a second instruction that indicates that the thread is exiting speculative execution, the second instruction including the SVT handle;
      using the SVT handle to access the first SVT entry in the synchronization variable table, the access including decrementing the in-use count; and
      after decrementing the in-use count, returning the in-use count.

7. The method of claim 6, further comprising:
   determining that the in-use count returned from the execution of the second command indicates that no other threads are still accessing the first range of shared memory addresses; and
   determining whether any data collisions occurred during the speculative execution.

8. The method of claim 7, further comprising:
   upon determining that no data collisions occurred, accessing the speculative write buffer to identify any entries which define a value written by the thread to the corresponding memory address during the speculative execution; and
   for each identified entry, writing the value in the entry to the corresponding memory address.

9. The method of claim 1, wherein detecting that the thread will be preempted comprises detecting the occurrence of an interrupt while the thread is executing.

10. The method of claim 9, wherein the interrupt is a periodic timer interrupt.

11. The method of claim 1, wherein the creating or updating of the first SVT entry is performed by a microarchitecture portion of an interrupt handler.

12. A processor comprising:
   an execution unit;
   a plurality of registers for storing values generated by the execution unit;
   a synchronization variable table; and
   one or more buffers for storing a speculative state of a thread while the thread is being executed in accordance with a thread level speculative execution technique;
   wherein the processor is configured to perform the following:
      during execution of a thread, executing the first instruction that indicates that the thread is entering into speculative execution, the first instruction including an address of a synchronization variable as an argument of the first function, the synchronization variable representing a first range of shared memory addresses that includes at least one memory address that the thread intends to access during speculative execution, executing the first instruction comprising:
         storing, within the processor, a current state of the thread that exists prior to executing the first instruction;
         creating or updating a first SVT entry in the synchronization variable table, the first SVT entry comprising the address of the synchronization variable, an in-use count, and an SVT handle representing the first SVT entry; and returning the SVT handle;

during speculative execution of the thread, maintaining, within the one or more buffers, a speculative state of the thread, the speculative state of the thread including a speculative write buffer that includes an entry for each memory address that the thread accesses during speculative execution, the speculative write buffer including a first buffer entry comprising the SVT handle, a particular memory address within the first range of shared memory addresses that was accessed by the first thread, and a value for the particular memory address;

detecting that the thread will be preempted during speculative execution; and writing the speculative state to memory to allow the speculative state to be recreated within the processor when execution of the thread is resumed.

13. The processor of claim 12, wherein the value in the first buffer entry is a value written by the thread during speculative execution.

14. The processor of claim 13, wherein the first buffer entry includes a first update timestamp defining a first time when the thread updated the value of the particular memory address during the speculative execution, and wherein the first buffer entry also includes a last update timestamp defining a last time when the thread updated the value of the particular memory address during the speculative execution.

15. The processor of claim 12, wherein the value in the first buffer entry is a value read by the thread during speculative execution.

16. The processor of claim 12, wherein the processor comprises multiple cores, each core having an execution unit, a plurality of registers, and one or more buffers, each core configured to access the synchronization variable table.

17. The processor of claim 16, wherein the processor maintains a speculative execution enable bit which when set enables speculative execution on any of the multiple cores, and each core maintains a speculative mode bit which when set indicates that the core is executing a thread speculatively.

18. The processor of claim 12, wherein the processor is further configured to perform the following:

after the preemption, resuming the speculative execution of the thread including:

executing a second instruction that indicates that the thread is exiting speculative execution, the second instruction including the SVT handle;

using the SVT handle to access the first SVT entry in the synchronization variable table, the access including decrementing the in-use count; and after decrementing the in-use count, returning the in-use count.

19. The processor of claim 18, wherein the processor is further configured to perform the following:

determining that the in-use count returned from the execution of the second command indicates that no other threads are still accessing the first range of shared memory addresses; and determining whether any data collisions occurred during the speculative execution.

20. A method for storing a speculative write buffer of a thread when the thread is preempted, the method comprising:

during execution of a thread, executing a first instruction that indicates that the thread is entering into speculative execution, the first instruction including an address of a synchronization variable as an argument of the first function, the synchronization variable representing a first range of shared memory addresses that includes at least one memory address that the thread intends to access during speculative execution, executing the first instruction comprising:

storing, within the processor, a current state of the thread that exists prior to executing the first instruction;

creating or updating a first SVT entry in a synchronization variable table, the first SVT entry comprising the address of the synchronization variable, an in-use count, and an SVT handle representing the first SVT entry; and returning the SVT handle;

during speculative execution of the thread, maintaining within the processor, a speculative state of the thread, the speculative state of the thread including a speculative write buffer that includes an entry for each memory address that the thread accesses during speculative execution, the speculative write buffer including a first buffer entry comprising the SVT handle, a particular memory address within the first range of shared memory addresses that was accessed by the first thread, and a value for the particular memory address;

detecting that the thread will be preempted during speculative execution;

storing the speculative state to allow the speculative state to be recreated within the processor when execution of the thread is resumed;

resuming execution of the thread by restoring the speculative state;

executing a second instruction that indicates that the thread is exiting speculative execution, the second instruction including the SVT handle;

using the SVT handle to access the first SVT entry in the synchronization variable table, the access including decrementing the in-use count;

after decrementing the in-use count, returning the in-use count;

determining that the in-use count returned from the execution of the second command indicates that no other threads are still accessing the first range of shared addresses;

determining whether any data collisions occurred during the speculative execution;

upon determining that no data collisions occurred, accessing the speculative write buffer to identify any entries which define a value written by the thread to the corresponding memory address during the speculative execution; and for each identified entry, writing the value in the entry to the corresponding memory address.

* * * * *